(12) United States Patent
Scott et al.

(10) Patent No.: US 6,216,174 B1
(45) Date of Patent: Apr. 10, 2001

(54) SYSTEM AND METHOD FOR FAST BARRIER SYNCHRONIZATION

(75) Inventors: Steven L. Scott, Eau Claire, WI (US); Richard E. Kessler, Shrewsbury, MA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/162,673

(22) Filed: Sep. 29, 1998

(51) Int. Cl.[7] .................................................. G06F 15/80
(52) U.S. Cl. ........................................ 709/400; 712/10
(58) Field of Search ................................ 709/400; 712/10

(56) References Cited

U.S. PATENT DOCUMENTS

| | | | |
|---|---|---|---|
| Re. 28,577 | 10/1975 | Schmidt | 179/15 |
| 4,330,858 | 5/1982 | Chouquet | 370/111 |
| 4,630,259 | 12/1986 | Larson et al. | 370/60 |
| 4,771,391 | 9/1988 | Blasbalg | 364/514 |
| 4,811,214 | 3/1989 | Nosenchuck et al. | 364/200 |
| 4,845,710 | 7/1989 | Nakamura et al. | 370/110.1 |
| 4,866,704 | 9/1989 | Bergman | 370/85.4 |
| 4,868,818 | 9/1989 | Madan et al. | 371/11 |
| 4,933,933 | 6/1990 | Dally et al. | 370/60 |
| 4,965,793 | 10/1990 | Polzin et al. | 370/94 |
| 4,974,143 | 11/1990 | Yamada | 364/200 |
| 4,980,822 | 12/1990 | Brantley et al. | 364/200 |
| 4,980,852 | 12/1990 | Giroir et al. | 364/900 |
| 4,987,537 | 1/1991 | Kawata | 364/200 |
| 4,995,056 | 2/1991 | Fogg et al. | 375/7 |
| 5,008,882 | 4/1991 | Peterson et al. | 370/943 |
| 5,027,330 | 6/1991 | Miller | 365/239 |
| 5,031,211 | 7/1991 | Nagai et al. | 379/221 |
| 5,036,459 | 7/1991 | Den Haan et al. | 364/200 |
| 5,068,784 | 11/1991 | Kishino et al. | 395/275 |
| 5,081,623 | 1/1992 | Ainscow | 370/85.4 |
| 5,083,265 | 1/1992 | Valiant | 395/800 |
| 5,105,424 | 4/1992 | Flaig et al. | 370/941 |

(List continued on next page.)

FOREIGN PATENT DOCUMENTS

| | | | |
|---|---|---|---|
| 0353819 | 2/1990 | (EP) . | |
| 0475282 | 9/1990 | (EP) . | |
| 0460599 | 12/1991 | (EP) . | |
| 0473452 | 3/1992 | (EP) | G06F/9/46 |
| 0479520 | 4/1992 | (EP) | G06F/15/16 |
| 0501524 | 9/1992 | (EP) . | |
| 0570729 | 11/1993 | (EP) . | |
| 87/01750 | 3/1987 | (WO) | E04B/1/94 |
| 88/01341 | 11/1988 | (WO) . | |
| 88/08652 | 11/1988 | (WO) | H04J/3/26 |
| WO8808652 | 11/1988 | (WO) . | |
| 95/16236 | 6/1995 | (WO) . | |

OTHER PUBLICATIONS

International Search Report for International Application No. PCT/IE 95/00047; Date of Completion—Dec. 22, 1995; Authorized Officer—R. Salm., (List continued on next page.)

Primary Examiner—David Y. Eng
(74) Attorney, Agent, or Firm—Schwegman, Lundberg, Woessner & Kluth, P.A.

(57) ABSTRACT

Improved method and apparatus for facilitating fast barrier synchronization in a parallel-processing system. A single input signal and a single output signal, and a single bit of state ("barrier_bit") is added to each processor to support a barrier. The input and output signal are coupled to a dedicated barrier-logic circuit that includes memory-mapped bit-vector registers to track the "participating" processors and the "joined" processors for the barrier. A "bjoin" instruction executed in a processor causes a pulse to be sent on the output signal, which in turn causes that processor's bit in the dedicated barrier-logic circuit's "joined" register to be set. When the "joined" bits for all participating processors (as indicated by the "participating" register) are all set, the "joined" register is cleared, and a pulse is sent to the input signal of all the participating processors, which in turn causes each of those processor's barrier_bit to be set.

30 Claims, 1 Drawing Sheet

U.S. PATENT DOCUMENTS

| | | | |
|---|---|---|---|
| 5,117,350 | 5/1992 | Parrish et al. | 395/425 |
| 5,127,092 * | 6/1992 | Gupta et al. | 712/234 |
| 5,134,690 | 7/1992 | Samatham | 395/200 |
| 5,157,692 | 10/1992 | Horie et al. | 375/38 |
| 5,161,156 | 11/1992 | Baum et al. | 371/7 |
| 5,170,482 | 12/1992 | Shu et al. | 395/800 |
| 5,175,733 | 12/1992 | Nugent | 370/94 |
| 5,195,100 | 3/1993 | Katz et al. | 371/66 |
| 5,201,044 | 4/1993 | Frey, Jr. et al. | 395/575 |
| 5,210,705 | 5/1993 | Chauvel et al. | 364/572 |
| 5,218,601 | 6/1993 | Chujo et al. | 370/16 |
| 5,218,676 | 6/1993 | Ben-ayed et al. | 395/200 |
| 5,233,618 | 8/1993 | Glider et al. | 371/68.1 |
| 5,239,545 | 8/1993 | Buchholz | 370/95.3 |
| 5,255,376 | 10/1993 | Frank | 395/325 |
| 5,274,799 | 12/1993 | Brant et al. | 395/575 |
| 5,276,899 | 1/1994 | Neches | 395/800 |
| 5,280,474 | 1/1994 | Nickolls et al. | 370/60 |
| 5,289,470 | 2/1994 | Chang et al. | 370/94.1 |
| 5,297,137 | 3/1994 | Ofek et al. | 370/60 |
| 5,303,244 | 4/1994 | Watson | 371/10.1 |
| 5,313,628 | 5/1994 | Mendelsohn et al. | 395/575 |
| 5,313,645 | 5/1994 | Rolfe | 395/800 |
| 5,331,631 | 7/1994 | Teraslinna | 370/60 |
| 5,333,279 | 7/1994 | Dunning | 395/325 |
| 5,341,504 | 8/1994 | Mori et al. | 395/800 |
| 5,345,565 | 9/1994 | Jibbe et al. | 395/325 |
| 5,347,450 | 9/1994 | Nugent | 395/200 |
| 5,353,283 | 10/1994 | Tsuchiya | 370/60 |
| 5,365,228 | 11/1994 | Childs et al. | 340/825.8 |
| 5,381,534 | 1/1995 | Shi | 395/200 |
| 5,383,191 | 1/1995 | Hobgood et al. | 371/112 |
| 5,390,164 | 2/1995 | Kremer | 370/16 |
| 5,394,528 | 2/1995 | Kobayashi et al. | 395/325 |
| 5,402,428 | 3/1995 | Kakuta et al. | 371/10.1 |
| 5,412,782 | 5/1995 | Hausman et al. | 395/250 |
| 5,432,784 | 7/1995 | Ozveren | 370/60.1 |
| 5,434,846 | 7/1995 | Themel et al. | 30/13 |
| 5,434,995 * | 7/1995 | Oberlin et al. | 709/400 |
| 5,440,547 | 8/1995 | Easki et al. | 370/60 |
| 5,444,701 | 8/1995 | Cypher et al. | 370/60 |
| 5,452,330 | 9/1995 | Goldstein | 375/257 |
| 5,452,444 | 9/1995 | Solomon et al. | 395/182.04 |
| 5,453,978 | 9/1995 | Sethu et al. | 370/60 |
| 5,457,683 | 10/1995 | Robins | 30/60 |
| 5,475,858 | 12/1995 | Gupta et al. | 395/800 |
| 5,499,337 | 3/1996 | Gordon | 395/182.04 |
| 5,513,192 | 4/1996 | Janku et al. | 371/50.1 |
| 5,517,497 | 5/1996 | LeBoudec et al. | 370/60.1 |
| 5,519,844 | 5/1996 | Stallmo | 395/441 |
| 5,521,916 | 5/1996 | Choudhury et al. | 370/60.1 |
| 5,522,031 | 5/1996 | Ellis et al. | 395/182.04 |
| 5,530,948 | 6/1996 | Islam | 395/182.04 |
| 5,533,198 | 7/1996 | Thorson | 395/200.15 |
| 5,539,449 | 7/1996 | Blahut et al. | 348/7 |
| 5,546,549 | 8/1996 | Barrett et al. | 395/300 |
| 5,546,596 | 8/1996 | Geist | 395/200.02 |
| 5,548,639 | 8/1996 | Ogura et al. | 379/221 |
| 5,550,589 | 8/1996 | Shiojiri et al. | 348/387 |
| 5,555,542 | 9/1996 | Ogura et al. | 370/94.1 |
| 5,566,321 | 10/1996 | Pase et al. | 395/480 |
| 5,574,849 | 11/1996 | Sonnier et al. | 395/182.1 |
| 5,581,705 | 12/1996 | Passint et al. | 395/200.13 |
| 5,583,990 | 12/1996 | Birrittella et al. | 395/200.01 |
| 5,590,124 | 12/1996 | Robins | 370/258 |
| 5,590,284 | 12/1996 | Crosetto | 395/200.05 |
| 5,594,869 | 1/1997 | Hawe et al. | 395/200.2 |
| 5,596,742 | 1/1997 | Agarwal et al. | 395/500 |
| 5,600,606 | 2/1997 | Rao | 365/233 |
| 5,617,409 | 4/1997 | Ozveren et al. | 370/235 |
| 5,619,647 | 4/1997 | Jardine et al. | 395/200.7 |
| 5,627,986 | 5/1997 | Frankland | 395/402 |
| 5,649,125 | 7/1997 | Tietjen et al. | 395/306 |
| 5,659,796 | 8/1997 | Thorson et al. | 395/200.71 |
| 5,684,961 | 11/1997 | Cidon et al. | 395/200.73 |
| 5,689,646 | 11/1997 | Thorson | 395/200.69 |
| 5,701,416 | 12/1997 | Thorson et al. | 395/800.11 |
| 5,721,819 | 2/1998 | Galles et al. | 395/200.15 |
| 5,721,921 * | 2/1998 | Kessler et al. | 709/12 |
| 5,790,776 | 8/1998 | Sonnier et al. | 395/189.08 |
| 5,793,962 | 8/1998 | Badovinatz et al. | 395/200.31 |
| 5,802,374 * | 9/1998 | Gupta et al. | 712/216 |

OTHER PUBLICATIONS

"Deadlock–Free Routing Schemes on Multistage Interconnection Networks", *IBM Technical Disclosure Bulletin*, 35, 232–233, (Dec., 1992).

"IEEE Standard for Scalable Coherent Interface (SCI)", *IEEE Std 1596–1992*, Table of Contents, (Mar. 1992).

"International Search Report for International Application No. PCT/US 95/15483", Date of completion—Apr. 24, 1996; Authorized Officer—P. Schenkels.

Adve, V.S., et al., "Performance Analysis of Mesh Interconnection Networks with Deterministic Routing", *Transactions on Parallel and Distributed Systems*, 225–246, (Mar. 1994).

Anderson, "ATM–Layer OAM Implementation Issues", *IEEE Communications Magazine*, vol. 29, Iss. 9, 79–81, (1991).

Bolding, K., "Non–uniformities Introduced by Virtual Channel Deadlock Prevention", *Technical Report 92–07–07*, Department of Computer Science and Engineering, FR–35 University of Washington; Seattle, WA 98195, (Jul. 21, 1992).

Bolla, F.R., "A Neural Strategy for Optimal Multiplexing of Circuit and Packet–Switched Traffic", *Department of Communications, Computer and Systems Science (DIST)*, University of Genova, 1324–1330.

Boura, Y.M., et al., "Efficient Fully Adaptive Wormhole Routing in n–dimenstional Meshes", *IEEE*, 589–596, (1994).

Bundy, A., et al., "Turning Eureka Stepsinto Calculations in Automatic Program", *UK IT, (IEE Conf. Pub. 316)*, pp. 221–226, (1991).

Carlile, B.R., "Algorithms and Design: The CRAP APP Shared–Memory System", *COMPCON Spring '93*, San Francisco, CA, 312–320, (Feb. 22, 1993).

Chapman, B., et al., "Programming in Vienna Fortran", *Dept. of Statistics and Coputer Science*, 121–160.

Chien, A.A., et al., "Planar–Adaptive Routing: Low–Cost Adaptive Networks for Multiprocessors", *Pro. 19th International. Symposium on Computer Architecture*, 268–277, (May 1992).

Dally, W., "Performance Analysis of k–ary n–cube Interconnection Networks", *IEEE Transactions on Computers*, vol. 39, No. 6, 775–785, (Jun. 1990).

Dally, W., et al., "Deadlock–Free Message Routing in Multiprocessor Interconnection Networks", *IEEE Transactions on Computers*, C–36, 547–553 (May 1987).

Dally, W.J., "Virtual Channel Flow Control", *Pro. 17th International Symposium on Computer Architecture*, pp. 60–68, May 1990.

Dally, W.J., et al., "Deadlock–Free Adaptive Routing in Multicomputer Networks Using Virtual Channels", *I.E.E.E. Transactions on Parallel and Distributed Systems,* vol. 4, No. 4, 466–475, (Apr. 1993).

Debenedictis, E., et al., "Extending Unix for Scalable Computing", *IEEE,* 43–53, (Nov. 1993).

Duato, J., "A New Theory of Deadlock–Free Adaptive Routing in Wormhole Networks", *I.E.E.E. Transactions on Parallel and Distributed Systems,* vol. 4, No. 12, at 1320–1331, Dec. 1993.

Farkouh, S.C., "Managing ATM–based Broadband Networks ", *IEEE Communications,* 31(5), pp. 82–86, (1993).

Gallager, R., "Scale Factors for Distributed Routing Algorithm", *NTV '77 Conference Record,* 2, at 2–1 through 2–5.

Galles, M., "Spider: A High–Speed Network Interconnect", *IEEE Micro,* 34–39, (Jan./Feb. 1997).

Glass, C.J., et al., "The Turn Model for Adaptive Routing", *Pro. 19th Interanational Symposium on Computer architecture,* 278–287, (May 1992).

Gravano, L., et al., "Adaptive Deadlock– and Livelock–Free Routing with all Minimal Paths in Torus Networks", *IEEE Transactions on Parallel and Distributed Systems,* vol. 5, No. 12, 1233–1251, (Dec. 1994).

Gupta, R., et al., "High speed Synchronization of Processors Using Fuzzy Barriers", *International Journakl of Parallel Programming 19 (1990) Feb.,* No. 1, New York, US pp. 53–73.

Gustavson, D.B., "The Scalable Coherent Interface and related Standards Projects", *IEEE Micro,* 10–22, (Feb., 1992).

Ishihata, H., et al., "Architecture of Highly Parallel AP1000 Computer", *Scripta Technica, Inc.,* Systems and Computers in Japan 24, No. 7,, pp. 69–76 (1993).

Jesshope, C.R., et al., "High Performance Communications in Processor Networks", *Proc. 16th International Symposium on Computer Architecture,* at 150–157, (May 1989).

Kirkpatrick, S., et al., "Optimization by Simulated Annealing", *Science,* May 13, 1993, vol. 220, No. 4598, 671–680.

Laudon, J., et al., "The SGI Origin: A ccNUMA Highly Scalable Server", *ISCA,* 1–11, (1997).

Lin, N.D., "ATM Virtual Path Self–Healing Based on a New Path Restoration Protocol", *IEEE,* vol. 2, Global Telecommunications Conference, Globecom '94, 794–798, (1994).

Linder, D.H., et al., "An Adaptive and Fault Tolerant Wormhole Routing Strategy for K–ARY N–Cubes", *IEEE Transactions on Computers.*

Lui, Z., et al., "Grouping Virtual Channels for Deadlock––Free Adaptive Wormhole Routing", *PARLE '93 Parallel Parallel Architectures and Languages Europe, 5th International PARLE Conference,* Munich, Germany, 255–265, (Jun. 14–17, 1993).

Mcdonald, T., "Addressing in Cray Research's MPP Fortran", *Third Workshop on Compilers for Parallel Computers,* 161–172 (Jul. 7, 1992).

Ni, L.M., et al., "A Survey of Wormhold Routing Techniques in Direct Networks", *Computer,* pp. 62–75, (1993).

Nuth, P., et al., "The J–Machine Network", *IEEE,* 420–423 (1992).

O'Keefe, M.T., et al., "Static Barrier MIMD: Architecture and Performance Analysis", *Journal of Parallel and Distributed Computing No. 2,,* pp. 126–132, (Mar. 25, 1995).

Patterson, D.A., et al., "A Case For Redundant Arrays Of Inexpensive Disks (RAID)", *University of California at Berkeley, Report No. UCB/CSD 87/391,* (Dec. 1987).

Scott, S., "The SCX Channel: A New, Supercomputer–Class System Interconnect", *Hot Interconnects III,* Abstract, pp. 1–11, (Aug. 1–11, 1995).

Shumay, M., "Deadlock–Free Packet Networks", *Transputer Research and Applications 2, NATUG–2 Proceedings of the Second Conference of the North American Transputer Users Group,* 140–177, (Oct. 18–19, 1989).

Snyder, L., "Introduction to the Configurable, Highly Parallel Computer", *IEEE,* pp. 47–56, (Jan. 1982).

Talia, D., "Message–Routing Systems for Transputer–Based Multicomputer", *IEEE Micro,* No. 3, pp. 62–72, (Jun. 13, 1993).

Wang, W., et al., "Trunk Congestion Control in Heterogeneous Circuit Switched Networks", *IEEE,* pp. 1156–1161.

Wu, M., et al., "DO and FORALL: Temporal and Spacial Control Structures", *Procedings, Third Workshop on Compilers for Parallel Computers,* ACPC/TR, Jul. 1992.

Yang, C.S., et al., "Performance Evaluation of Multicast Wormhole Routing in 2D–Torus Multicomputers", *IEEE,* 173–178, (1992).

Yantchev, J., et al., "Adoptive, low latency, deadlock–free packet routing for networks of processors", *IEEE Proceedings,* 136, pp. 178–186, (May 1989).

\* cited by examiner

SYSTEM AND METHOD FOR FAST BARRIER SYNCHRONIZATION

CROSS-REFERENCES TO RELATED INVENTIONS

This invention is related to U.S. Pat. No. 5,434,995 issued Jul. 18, 1995, and to application Ser. No. 08/450,251 filed May 25, 1995, now U.S. Pat. No. 5,721,921 and to application Ser. No. 08/972,010 filed Nov. 17, 1997, now U.S. Pat. No. 6,085,303 each of which are hereby incorporated by reference.

FIELD OF THE INVENTION

The present invention relates to methods and apparatus for parallel multiprocessor systems and more specifically to synchronization of processes running on multiprocessor systems.

BACKGROUND OF THE INVENTION

Massively parallel processing (MPP) systems are computing systems that include hundreds or thousands of processing elements (PEs). While the power of a multiple-instruction multiple-data (MIMD) MPP computer system lies in its ability to execute independent threads of code simultaneously, the inherently asynchronous states of the PEs (with respect to each other) makes it difficult in such a system to enforce a deterministic order of events when necessary. Program sequences involving interaction between multiple PEs such as coordinated communication, sequential access to shared resources, controlled transitions between parallel regions, etc., may require synchronization of the PEs in order to assure proper execution.

Other information processing systems include a plurality of PEs, but have fewer processors than MPP systems. Such systems can be based on an interconnect systems similar to those used for MPPs, or can be bus based.

Very fast synchronization is required for high-performance parallel processing with asynchronous processors (i.e., processors which execute programs independently of each other). This synchronization involves communication among the computational entities which work together on an overall application program. An important synchronization capability in any programming model is the "barrier". Barriers are points placed in the code beyond which no processor participating in a particular computation is to be allowed to proceed until all processors have arrived at their respective barrier points. Since PEs may wait at a barrier until alerted that all PEs have arrived at the barrier, it is very important to minimize the latency of the barrier mechanism. The latency of a barrier mechanism is defined as the period of time between when the last processor arrives at a barrier, and when all processors have been notified that the requirements of the barrier have been satisfied (the term for meeting these requirements is also called "satisfying the barrier"). During this period of time, all PEs may be idle waiting for the barrier to be satisfied. Hence barriers can be used as a serialization point in a parallel code (a point from which all PEs can proceed ahead, having waited for other PEs to be synchronized). Because a barrier defines a serialization point in a program, it is important to keep the barrier latency as low as possible, in order that the work to be done after the barrier can be started as soon as possible.

Another important synchronization capability in any programming model is the "eureka". Eureka are points placed in the code which notify all other processors of a particular group of processors participating in a computation that one processor has reached that eureka point in its computation. Typically, the eureka point is a notification that the processor has reached a solution to the computation (e.g., found the item being searched for by the group). Since processors will typically abandon the work they are doing upon being notified that another PE has arrived at its eureka point, it is also very important to minimize the latency of the eureka mechanism. The latency of a eureka mechanism is defined as the period of time between when the first processor arrives at a eureka, and when all processors have been notified that the eureka has been satisfied. During this period of time, all other PEs may be doing fruitless computation even though the eureka has been satisfied. As soon as the other PEs have been notified that the eureka has been satisfied, they can proceed to the next stage of their computation. Hence eurekas can also be used as a serialization point in a parallel code. Because a eureka defines a serialization point in a program, it is important to keep the eureka latency as low as possible.

Barriers and eurekas can be implemented entirely by software means, but software schemes are typically encumbered by long latencies and/or limited parallelism restricting how many processors can arrive at the barrier simultaneously without artificial serialization (e.g., atomic test-and-set or read-modify-write type operations which impose serialization by software convention or style).

Hardware support for barriers and eurekas, while reducing the latency problems associated with barriers and eurekas implemented by purely software means, can have other shortcomings that limit the utility of the mechanism in a production computing system. (Production computing systems, which support many users and often have less controlled environments than do more theoretical test-bed computing systems, demand that the barrier resource and eureka resource—like all resources—be partitionable among multiple users while maintaining protective boundaries between users.) In addition, the barrier resource and eureka resource must have functions which are rich enough to allow isolation between the operating system and the user executing within the same partition. Provision must also be made for fault tolerance to insure the robust nature of the barrier and eureka mechanism.

Hardware mechanisms may also suffer from an inability to operate synchronously. This inability may require that a PE, upon discovering that a barrier has been satisfied (all PEs have arrived at that barrier point in the program) or that a eureka has been satisfied (one PE has arrived at that eureka point in the program), wait until all PEs have discovered that the barrier or eureka has been reached before it may proceed through the next section of program code. The ability to operate synchronously enables the barrier mechanism and eureka mechanism to be immediately reusable without fear of race conditions (e.g., where, due to timing variances, some PEs cannot determine whether the barrier is being "armed" (initialized), has been armed, or has been satisfied).

Hardware mechanisms may also require that a PE explicitly test a barrier flag or eureka flag to discover when the respective condition has been satisfied. This can prevent a PE from accomplishing other useful work while the barrier remains unsatisfied, or force the programmer to include periodic tests of the barrier and eureka into the program in order to accomplish other useful work while a barrier or eureka is pending. This can limit the usefulness of a eureka mechanism when used as a means of terminating speculative parallel work (e.g., a database search) when the work has been completed (e.g. the searched-for item has been found).

Hardware mechanisms may require that the overall barrier tree be hardwired in a rigid configuration. While subportions of the barrier tree may be used for separate barrier networks, there is often little flexibility to configure various barrier trees.

It is often desirable to allocate some, but not all, of the processors in a parallel-processing network to some particular application (software) program, and to use the other remaining processors for some other program. This allocation can change over time. It is thus desirable to have a subset of all processors in a parallel-processing network participating in a barrier and/or eureka synchronization, and to be able to dynamically change the configuration over time.

SUMMARY OF THE INVENTION

The present invention provides a system and method for very fast barrier synchronization in a parallel-processing system. A single input signal and a single output signal, and a single bit of state ("barrier_bit") is added to each processor to support a barrier. The input and output signal are coupled to a dedicated or central barrier-logic circuit that includes memory-mapped bit-vector registers to track the "participating" processors and the "joined" processors for the barrier. A "bjoin" instruction executed in a processor causes a pulse to be sent on the output signal, which in turn causes that processor's bit in the dedicated barrier-logic circuit's "joined" register to be set. When the "joined" bits for all participating processors (as indicated by the "participating" register) are all set, the "joined" register is cleared, and a pulse is sent to the input signal of all the participating processors, which in turn causes each of those processor's barrier_bit to be set.

In one embodiment,, the present invention provides an information processing system. The system includes a first plurality of processing elements (PEs) and an interconnection communications network that connects to each one of the first plurality of PEs. The system also includes a first synchronization circuit coupled to each one of the first plurality of PEs. The first synchronization circuit includes a register that indicates which ones of the first plurality of PEs have joined in the first barrier, and a logic circuit that determines whether all the PEs that are participating in the first barrier are indicated as joined in the first barrier, and if so, the logic circuit sends a completion signal to each of the PEs participating in the first barrier. In one embodiment, a register that indicates which ones of the first plurality of PEs are participating in a first barrier is also included, and the completion signal is sent to participating processors once all of the processors indicated as participating in the barrier have joined the barrier.

In one such embodiment, each one of the first plurality of PEs includes an output signal, an input signal, and a barrier-bit register. The barrier-bit register changes state upon an activation from the input signal. Also, each of the PEs has an instruction set that includes: a barrier-join instruction that causes activation of the output signal, the output signal indicating that a barrier has been joined, a barrier-read instruction that causes at least one of a read or a test of a value held in the barrier-bit register, and a barrier-set instruction that causes a value to be either set, reset, or written into the barrier-bit register. In some embodiments, the activation of the output and/or signal is indicated by a pulse.

In some embodiments, the system includes two or more synchronization circuits as described above, each connected to a different subset of the PEs.

Another aspect of the present invention is a microprocessor that supports barrier synchronization as described above.

Yet another aspect of the present invention is a method for synchronizing barrier events in a parallel-processing information processing system having an interconnection communication network connected to a plurality of processor entities (PEs) including a first PE and a plurality of other PEs. The method includes the steps of: activating an output signal of the first PE, the output signal indicating that a barrier has been joined by the first PE; detecting an activation from an input signal of the first PE; changing a state of a barrier-bit register upon detecting the activation from the input signal; and executing a branch instruction based on the state of the barrier bit register.

In one such embodiment, the method further includes the step of setting the state of the barrier-bit register to a predetermined value based upon executing the branch instruction. In another such embodiment, the step of activating of the output signal and/or the input signal is indicated by a pulse.

In one embodiment, the method further includes the step of determining whether all of a set of participating processor elements have joined a barrier, and if so, then activating the input signal.

The present barrier/eureka mechanism provides a partitionable, low-latency, immediately reusable, robust mechanism which can operate on a physical data-communications network and can be used to alert all PEs in a barrier partition of the fact that all of the PEs in that partition have reached a designated barrier point in their individual program code.

In various embodiments, the present invention provides a computer system, a dedicated barrier-logic circuit, and/or a method for fast barrier synchronization.

Another aspect of the present invention provides an information processing system. The system includes a plurality of processing elements (PEs, an interconnection communications network that connects to each one of the plurality of PEs, and a first synchronization circuit coupled to each one of the first plurality of PEs. The first synchronization circuit includes a register that indicates which ones of the first plurality of PEs are participating in a first eureka-barrier, a register that indicates which ones of the first plurality of PEs have joined in the first eureka-barrier, and a logic circuit that determines whether any of the PEs that are indicated as participating in the first eureka-barrier are also indicated as joined in the first eureka-barrier, and if so, the logic circuit sends a completion signal to each of the PEs participating in the first eureka-barrier.

DESCRIPTION OF PREFERRED EMBODIMENTS

Figure 1:
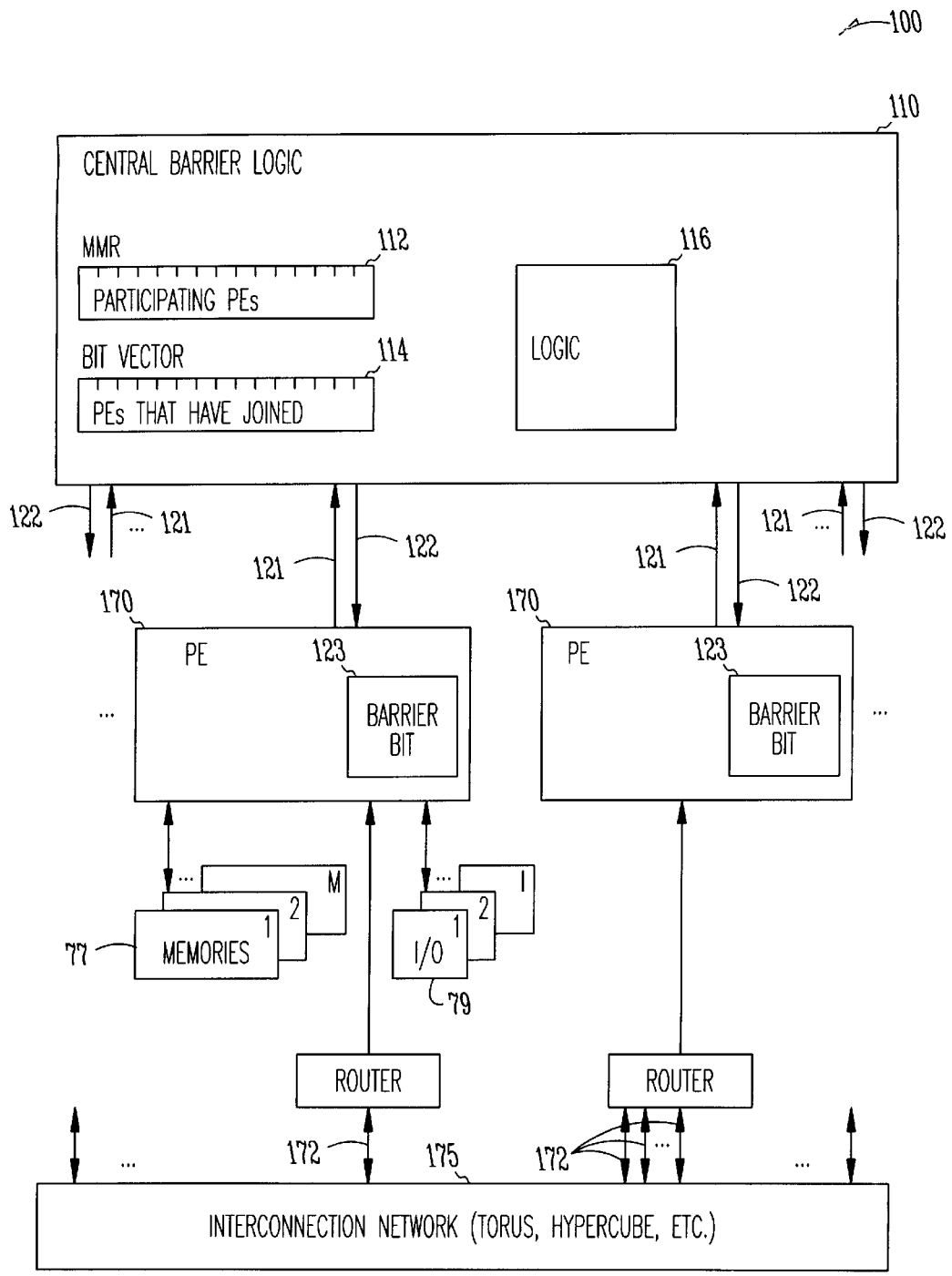
FIG. 1 shows one embodiment of parallel-processing system 100 of the present invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The present invention provides a very fast barrier synchronization mechanism for use among several processors.

This can be used for tight coordination of processors to exploit fine-grained parallelism.

FIG. 1 shows one embodiment of parallel-processing system 100 of the present invention. In the embodiment shown, parallel-processing system 100 has two or more processor entities (PEs) 170, wherein each PE 170 has zero to M memories 77, and zero to I input/output (I/O) subsystems 79. Depending on the needs of a user, interconnection network 175 can be set up as a three-dimensional torus, an N-dimensional hypercube, or any other suitable interconnection network between PEs 170. In one embodiment, a massively parallel processor system is implemented using interconnection network 175. In the embodiment shown, each PE 170 is connected to its own dedicated router having between one and L links 172, wherein each link 172 can be used to connect to other routers. In other embodiments, a plurality of PEs 170 will share a router used as an interconnection node in the network 175. In some embodiments, memories 77 and (I/O) subsystems 79 are connected through interconnection network 175. In another embodiment, PEs 170 are interconnected via one or more busses in a bus-based system, with memories 77 and (I/O) subsystems 79 also connected to one or more of the one or more busses.

In the embodiment shown, each PE 170 is a microprocessor similar to an Alpha microprocessor such as an EV6 (available from Digital Equipment Corporation of Maynard, Mass.) which is modified with the circuitry as described herein. In another embodiment, a MIPS microprocessor (available from Silicon Graphics, Inc. having an office at 2011 N. Shoreline Blvd., Mountain View Calif. 94043) is modified and used as described herein.

In one embodiment, the invention involves modifications to a microprocessor as well as some external circuitry, as follows:

ADDITIONS TO MICROPROCESSOR

Resources:
    one output signal 121,
    one input signal 122,
    one bit of state (BARRIER_BIT 123)
Instructions:
    bjoin—sends a pulse out the output wire 121,
    brd—returns the state of BARRIER_BIT 123 (0 or 1) into a register,
    brst—resets BARRIER_BIT 123 to zero (0),
    bset—sets BARRIER_BIT 123 to one (1)
Behavior:
    When the input wire 122 is pulsed, BARRIER_BIT 123 is set to one.

The brst instruction is used after the processor has determined that a barrier has completed, in order to clear BARRIER_BIT 123 for the next barrier operation.

The bset and brst instructions are used as needed when context-switching, in order to set or reset, respectively, the BARRIER_BIT when switching a context "in" to the value as was determined when previously switching the same context "out". The bset and brst instructions do not require an operand. In other embodiments, these two instructions are replaced by a single instruction (e.g., a bwrt instruction) that writes the value of an operand (e.g., from a register) into BARRIER_BIT 123, but such an instruction requires setting the desired value into the operand before it is used. Together, instructions such as bset and brst or bwrt are termed "barrier-set" instructions.

The brd instruction is used to read the value from BARRIER_BIT 123 into a register, in order that the value can be used to determine whether to branch. In other embodiments, this instruction is replaced by a test instruction that sets a condition code which can be used to determine whether to branch, or by a test-and-branch instruction that combines the read, test and branch functions. Together, such instructions are termed "barrier-read" instructions.

Output signal 121 and input signal 122 can be implemented in a number of ways known to the art. In one embodiment, the output signal 121 is an output wire of the microprocessor of PE 170, and the input signal 122 is an input wire of the microprocessor of PE 170. In other embodiments, output signal 121 and input signal 122 are implemented on optical fibers. In still other embodiments, output signal 121 and input signal 122 are implemented as time-domain multiplexed signals on a single wire or optical fiber, wherein output signal 121 is taken from one system-level clock edge or pulse, and input signal 122 is taken from another. An "activation" of output signal 121 (and similarly of input signal 122) is a state or value detectable by circuitry connected to the signal, and can be as a pulse (active high or active low), an active logic level coinciding with a clock pulse, or an active logic level. In one embodiment, a pulse-based circuitry is used for generation and detection of the activation of output signal 121 (and similarly of input signal 122) in order that timing uncertainties of clock edges and voltage uncertainties of active logic levels do not introduce problems into the operation of the circuitry.

The fast barrier mechanism of the present invention is particularly useful for a tightly coupled system employing multiple processors on a single chip. In such a system, the input and output wires would not leave the chip, but would rather be between processor logic and system logic on the same chip.

FAST BARRIER CIRCUIT 110

A memory-mapped bit-vector register PARTICIPATING_PEs 112 specifies which processors are participating in the barrier.

The state of which processors have joined the current barrier is maintained via a memory-mapped bit-vector register JOINED_PEs 114 (rather than a counter, in order that double joins by a single processor do not result in an erroneous indication that the barrier has completed before all participating PEs have joined). This state should be writable and readable for context switching and initialization. In this embodiment, there is a one-to-one correspondence between bits in register JOINED_PEs 114 and bits in register PARTICIPATING_PEs 112, each respective bit corresponds to one of the PEs 170.

In one embodiment, logic circuit 116 receives pulses from signals 121 from each PE 170 that is connected to it. When such a pulse is received, the corresponding bit in register JOINED_PEs 114 is set to indicate that this PE 170 has joined the barrier.

In one embodiment, at the start of a barrier operation, all of the bits of register JOINED_PEs 114 are cleared to zeros, and selective bits in register PARTICIPATING_PEs 112 are set to ones (each respective bit in register PARTICIPATING_PEs 112 indicates whether or not the corresponding PE 170 is participating in that barrier).

When a pulse from a processor (one of the PEs 170) is received, the bit in register JOINED_PEs 114 corresponding to that processor is set by logic 116. In one embodiment, if a subsequent pulse from that processor is received, the bit corresponding to that processor remains set.

Once a pulse from each participating processor has been received, (i.e., for every bit in register PARTICIPATING_PEs 112 that is set indicating that the corresponding PE 170 is participating, the corresponding bit in register JOINED_PEs 114 is also set (indicating that a bjoin operation has been performed by that PE 170, and a pulse has been received from its output signal 121)), logic 116 causes a pulse that indicates "barrier-complete" to be sent on signals 122 to every participating PE 170 on its respective input wire 122, and the state is reset (i.e., all bits of register JOINED_PEs 114 are cleared to zero by logic 116).

In one embodiment, the register PARTICIPATING_PEs 112 is omitted, and all PEs connected to the circuitry participate in every barrier. In another such embodiment, the register PARTICIPATING_PEs 112 is omitted, and those bits of register JOINED_PEs 114 that correspond to those respective PEs not participating in a barrier are set to ones at the start of a barrier operation. An AND-type logical function is performed on all bits of register JOINED_PEs 114. Since the non-participating PEs already have their respective bits set to ones, once all of the participating PEs have set their respective bits to ones also, the AND-type logical function will be activated, and the completion signal will be sent to all PEs.

In another embodiment, logic 116 provides a eureka-type function (i.e., an OR-type logical function) which causes a pulse that indicates "eureka complete" to be sent on signals 122 to every participating PE 170 on its respective input wire 122. Such a "eureka" is complete once any one of the participating PEs joins, and is used for eureka-type synchronization.

In other embodiments, rather than pulses indicating joins on output signal lines 121, and pulses indicating barrier completions on input signal lines 122, a logic high (or logic low) is used. In one such embodiment, for example, a bjoin instruction causes a logic high on output line 121 which remains there until all participating processors have joined, thus causing all participating input lines 122 to be driven high by circuit 110 indicating "barrier complete". Upon receiving the barrier complete signal, each PE would drop its output line to a logic low, thus causing the barrier-complete signals to all drop to logic low. In one such an embodiment, the JOINED_PEs register 114 is not needed, and is omitted, since the bits values that would have been stored there are available on lines 121.

The Fast Barrier Circuit 110's fast-barrier MMRs (the memory-mapped registers PARTICIPATING_PEs 112 and JOINED_PEs 114), should be user-accessible, but the OS of course must gang-schedule jobs that use the fast barrier since there is no context information.

This mechanism implements a non-blocking barrier, which allows some flexibility in programming (a processor can join the barrier, continue to do other work, and poll). The likely use for this barrier, however, is very tight synchronization, in which case a processor will likely spin after joining the barrier. This implementation allows a tight, internal spin loop code as follows:

```
        bjoin              /*join the barrier once the necessary work is
                           complete*/
Spin:   brd     Rx         /*test barrier_bit which will only be set once
                           all other participating PEs 170 have joined this
                           barrier */
        beq     Rx, Spin   /* if the bit read into Rx is zero, branch back to
                           Spin */
        brst               /* re-clear barrier_bit to prepare for the next
                           barrier */
        ...                /* continuation of code, barrier has been joined
                           by all */
```

Transitions between successive barriers are safe due to the internal state bit (barrier_bit 123) and use of pulses for signaling. They are fast because no external handshaking is required.

This invention improves upon other barrier mechanisms that use shared memory (used in many multiprocessors) or memory-mapped registers (such as are used in Cray T3D and T3E parallel processors).

This invention solves the problem of high barrier synchronization latency. Performing synchronization among multiple microprocessors using memory instructions involves higher latency, as it takes many clock periods for these requests to become visible externally.

A dedicated, very-low-latency path off the microprocessor for performing barrier synchronization is provided, along with dedicated instructions for performing barriers. Advantages are that this mechanism performs barrier synchronization with lower latency by using simple circuitry optimized for the task.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An information processing system comprising:
   a first plurality of processing elements (PEs);
   an interconnection communications network, wherein the communications network connects to each one of the first plurality of PEs; and
   a first synchronization circuit coupled to each one of the first plurality of PEs, the first synchronization circuit comprising:
   a register that indicates which ones of the first plurality of PEs have joined in the first barrier; and
   a logic circuit that determines whether all the first plurality of PEs are indicated as joined in the first barrier, and if so, the logic circuit sends a completion signal to each of the first plurality of PEs.

2. The information processing system according to claim 1, wherein pulses received from each one of the first plurality of PEs change the state of the register that indicates which ones of the first plurality of PEs have joined in the first barrier.

3. The information processing system according to claim 1, wherein each one of the first plurality of PEs comprises:
   an output signal;
   an input signal; and
   a barrier-bit register, the barrier-bit register changing state upon an activation from the input signal;
   and wherein each one of the first plurality of PEs has an instruction set that comprises:
   a barrier-join instruction that causes activation of the output signal, the output signal indicating that a barrier has been joined;

a barrier-read instruction that causes at least one of a read or a test of a value held in the barrier-bit register; and a barrier-set instruction that causes a value to be either set, reset, or written into the barrier-bit register.

4. The information processing system according to claim 3, wherein the activation of the output signal is indicated by a pulse.

5. The information processing system according to claim 4, wherein the activation of the input signal is indicated by a pulse.

6. The information processing system according to claim 1, further comprising:

a second plurality of processing elements (PEs), wherein the communications network connects to each one of the second plurality of PEs; and a second synchronization circuit coupled to each one of the second plurality of PEs, the second synchronization circuit comprising:

a register that indicates which ones of the second plurality of PEs have joined in the second barrier; and a logic circuit that determines whether all of the second plurality of PEs are indicated as joined in the second barrier, and if so, the logic circuit sends a completion signal to each of the second plurality of PEs.

7. The information processing system according to claim 6, wherein each one of the second plurality of PEs comprises:

an output signal;

an input signal; and a barrier-bit register, the barrier-bit register changing state upon an activation from the input signal;

and wherein each one of the first and second plurality of PEs has an instruction set that comprises:

a barrier-join instruction that causes activation of the output signal, the output signal indicating that a barrier has been joined;

a barrier-read instruction that causes at least one of a read or a test of a value held in the barrier-bit register; and a barrier-set instruction that causes a value to be either set, reset, or written into the barrier-bit register.

8. The information processing system according to claim 7, wherein the activation of the output signal is indicated by a pulse.

9. The information processing system according to claim 8, wherein the activation of the input signal is indicated by a pulse.

10. A microprocessor comprising:

an output signal;

an input signal; and a barrier-bit register, the barrier-bit register changing state upon an activation from the input signal;

wherein the microprocessor has an instruction set that comprises:

a barrier-join instruction that causes activation of the output signal, the output signal indicating that a barrier has been joined;

a barrier-read instruction that causes at least one of a read or a test of a value held in the barrier-bit register; and a barrier-set instruction that causes a value to be either set, reset, or written into the barrier-bit register.

11. The microprocessor according to claim 10, wherein the activation of the output signal is indicated by a pulse.

12. The microprocessor according to claim 11, wherein the activation of the input signal is indicated by a pulse.

13. An information processing system comprising:

a first plurality of processing elements (PEs);

an interconnection communications network, wherein the communications network connects to each one of the first plurality of PEs; and a first synchronization circuit coupled to each one of the first plurality of PEs, the first synchronization circuit comprising:

a register that indicates which ones of the first plurality of PEs are participating in a first barrier;

a register that indicates which ones of the first plurality of PEs have joined in the first barrier; and a logic circuit that determines whether all the PEs that are indicated as participating in the first barrier are also indicated as joined in the first barrier, and if so, the logic circuit sends a completion signal to each of the PEs participating in the first barrier.

14. The information processing system according to claim 13, wherein pulses received from each one of the first plurality of PEs change the state of the register that indicates which ones of the first plurality of PEs have joined in the first barrier.

15. The information processing system according to claim 13, wherein each one of the first plurality of PEs comprises:

an output signal;

an input signal; and a barrier-bit register, the barrier-bit register changing state upon an activation from the input signal;

and wherein each one of the first plurality of PEs has an instruction set that comprises:

a barrier-join instruction that causes activation of the output signal, the output signal indicating that a barrier has been joined;

a barrier-read instruction that causes at least one of a read or a test of a value held in the barrier-bit register; and a barrier-set instruction that causes a value to be either set, reset, or written into the barrier-bit register.

16. The information processing system according to claim 15, wherein the activation of the output signal is indicated by a pulse.

17. The information processing system according to claim 16, wherein the activation of the input signal is indicated by a pulse.

18. The information processing system according to claim 13, further comprising:

a second plurality of processing elements (PEs), wherein the communications network connects to each one of the second plurality of PEs; and a second synchronization circuit coupled to each one of the second plurality of PEs, the second synchronization circuit comprising:

a register that indicates which ones of the second plurality of PEs are participating in a second barrier;

a register that indicates which ones of the second plurality of PEs have joined in the second barrier; and a logic circuit that determines whether all the PEs that are indicated as participating in the second barrier are also indicated as joined in the second barrier, and if so, the logic circuit sends a completion signal to each of the PEs participating in the second barrier.

19. The information processing system according to claim 18, wherein each one of the second plurality of PEs comprises:

an output signal;

an input signal; and a barrier-bit register, the barrier-bit register changing state upon an activation from the input signal;

and wherein each one of the first and second plurality of PEs has an instruction set that comprises:

a barrier-join instruction that causes activation of the output signal, the output signal indicating that a barrier has been joined;

a barrier-read instruction that causes at least one of a read or a test of a value held in the barrier-bit register; and a barrier-set instruction that causes a value to be either set, reset, or written into the barrier-bit register.

20. The information processing system according to claim 19, wherein the activation of the output signal is indicated by a pulse.

21. The information processing system according to claim 20, wherein the activation of the input signal is indicated by a pulse.

22. A method for synchronizing barrier events in a parallel-processing information processing system having an interconnection communication network, the communication network connected to a plurality of processor entities (PEs) including a first PE and a plurality of other PEs, comprising the steps of:

activating an output signal of the first PE, the output signal indicating that a barrier has been joined by the first PE;

detecting an activation from an input signal of the first PE;

changing a state of a barrier-bit register upon detecting the activation from the input signal; and executing a branch instruction based on the state of the barrier bit register.

23. The method according to claim 22, further comprising the step of:

setting the state of the barrier-bit register to a predetermined value based upon executing the branch instruction.

24. The method according to claim 22, wherein the activating of the output signal is indicated by a pulse.

25. The method according to claim 22, wherein the detecting of the input signal includes detecting a pulse.

26. The method according to claim 22, further comprising the step of:

determining whether all of a set of participating processor elements have joined a barrier, and if so, then activating the input signal.

27. An information processing system comprising:

a first plurality of processing elements (PEs);

an interconnection communications network, wherein the communications network connects to each one of the first plurality of PEs; and a first synchronization circuit coupled to each one of the first plurality of PEs, the first synchronization circuit comprising:

a register that indicates which ones of the first plurality of PEs are participating in a first eureka-type synchronization;

a register that indicates which ones of the first plurality of PEs have joined in the first eureka-type synchronization; and a logic circuit that determines whether any of the PEs that are indicated as participating in the first eureka-type synchronization are also indicated as joined in the first eureka-type synchronization, and if so, the logic circuit sends a completion signal to each of the PEs participating in the first eureka-type synchronization.

28. The information processing system according to claim 27, wherein pulses received from each one of the first plurality of PEs change the state of the register that indicates which ones of the first plurality of PEs have joined in the first eureka-type synchronization.

29. The information processing system according to claim 27, wherein each one of the first plurality of PEs comprises:

an output signal;

an input signal; and a barrier-bit register, the barrier-bit register changing state upon an activation from the input signal;

and wherein each one of the first plurality of PEs has an instruction set that comprises:

a barrier-join instruction that causes activation of the output signal, the output signal indicating that a barrier has been joined;

a barrier-read instruction that causes at least one of a read or a test of a value held in the barrier-bit register; and a barrier-set instruction that causes a value to be either set, reset, or written into the barrier-bit register.

30. The information processing system according to claim 29, wherein the activation of the output signal is indicated by a pulse, and wherein the activation of the input signal is indicated by a pulse.

* * * * *